United States Patent [19]
Warfel

[11] 3,955,178
[45] May 4, 1976

[54] SIGNATURE AUTHENTICATION SYSTEM

[76] Inventor: George H. Warfel, 1305 Hillview Drive, Menlo Park, Calif. 94025

[22] Filed: Oct. 9, 1974

[21] Appl. No.: 513,428

[52] U.S. Cl. .................. 340/146.3 SY; 235/61.7 B; 235/92 TF; 340/149 A
[51] Int. Cl.² .......................................... G06K 9/00
[58] Field of Search .............. 340/146.3 SY, 149 R, 340/149 A; 178/18, 19; 235/151.32, 92 GC, 92 DE, 92 T, 92 TF, 61.7 R, 61.7 B; 73/432 A, 432 CR

[56] References Cited
UNITED STATES PATENTS

| | | | |
|---|---|---|---|
| 3,618,019 | 11/1971 | Nemirovsky et al. | 340/146.3 SY |
| 3,699,517 | 10/1972 | Dyche | 340/146.3 SY |
| 3,818,133 | 6/1974 | Cotter | 178/18 |
| 3,875,331 | 4/1975 | Hasenbalg | 340/146.3 SY |

*Primary Examiner*—Leo H. Boudreau
*Attorney, Agent, or Firm*—Nilsson, Robbins, Dalgarn & Berliner

[57] ABSTRACT

A system is disclosed for authenticating a signature on the basis of its execution. Generally, the system senses the speed of the tip of a writing instrument as a criterion for developing an identification or characterization of the signature. As disclosed, a tablet is provided defining a surface which is scored orthogonally to create impulses (by pen contact) that relate to the speed of the tip of a pen. The impulses are sensed as an electrical signal which is processed to derive a characterization of the signature. In one disclosed embodiment, signatures are characterized by the number of impulses developed during a substantial portion of the signing interval. In another disclosed embodiment, signatures are characterized by the time required (in the course of executing a signature) to generate a predetermined number of impulses. In still another embodiment, a system is disclosed to include apparatus for deriving a developed code identification from the signature impulses along with structure for performing a comparison between "test" and "standard" characterizations. Each of the systems as disclosed include means for manifesting authenticity characteristics indicating the likely authenticity of a signature.

10 Claims, 7 Drawing Figures

SIGNATURE AUTHENTICATION SYSTEM

BACKGROUND AND SUMMARY OF THE INVENTION

During the past several years, considerable effort has been devoted to various systems for authenticating the identity of a person who is about to engage in a credit transaction. Considering an exemplary application for such systems, in the course of the present trend toward a cashless or checkless society, credit transactions are frequently concluded between strangers on the basis of a credit card or other identification device. As widely recognized, not infrequently credit cards (the term being used collectively herein) are diverted to fall into the hands of unscrupulous persons with a resulting substantial loss. A major portion of such losses could be avoided by positive identification of the person bearing the credit card at the time the card is used as a basis for the extension of credit.

Various prior proposals have been made for identifying an assigned card bearer, e.g. photographs on the cards, physical descriptions on the cards, code techniques for variously testing or identifying the user, and so on. However, in general, such prior proposals have either involved relatively expensive or complex structures, or have imposed undue burdens upon one or both of the parties actually consummating the transaction. As a consequence, a considerable need exists for an effective, inexpensive, and simple system for authenticating the identification of a person entering a credit transaction on the basis of a presented credit card.

Traditionally, binding commitments of a person have been evidenced by his signature. In fact, it is conventional for a signature to evidence even very small credit transactions. In addition to evidencing the commitment, to some extent the signature has also served as a basis for identification. That is, in the context considered above, efforts have been made to obtain a comparison between the executed signature and a recorded signature, as borne on a credit card, to confirm the identity of the signing person. Unfortunately, the comparison is frequently performed by persons with little or no training or expertise in handwriting analysis who often must perform the comparison under extremely adverse circumstances. As a consequence, this widespread procedure is questionably effective in confirming identification and deterring the improper use of credit cards.

Efforts to improve the reliability of the written signature as a means of identification have been suggested that are somewhat separate and apart from the executed form. That is, it has been proposed to characterize the motion pattern of a pen point during the execution of a signature in the form of data to confirm the identity of the signer. Specifically, such a system is disclosed in U.S. Pat. No. 3,699,517, issued Oct. 17, 1972, to James W. Dyche and 3,145,367, issued Aug. 18, 1964, to H. D. Crane.

As previously proposed, characterizing the motion pattern of a pen point to confirm the identity of a singer has generally involved rather complex and expensive apparatus. In that regard, a need exists for a system which may be embodied in a simple, small and relatively inexpensive unit for dynamically authenticating a person executing a signature. In that regard, and in accordance herewith, relative speeds of the pen point have been found to afford effective criteria. That is, in general, the system of the present invention involves relating the speed or velocity of a pen point to characterize or identify a signature. The system hereof may be embodied in units for use with any of a variety of writing implements, without criticality as to signature location, which units are relatively simple, inexpensive and convenient in use. In simple embodiments the operating philosophy is based upon the premise that forgeries are usually executed in a slow and deliberate manner or at least at a different speed than the true signatory, which information is not generally available. More elaborate embodiments incorporate additional structure for deriving other characteristic identification data.

BRIEF DESCRIPTION OF THE DRAWINGS

The drawings, disclosing illustrative embodiments of the present invention, serve to present the various objectives and advantages hereof and are as follows.

DESCRIPTION OF THE ILLUSTRATIVE EMBODIMENTS

The disclosed embodiments exemplify the invention in what is presently considered the best modes of operation for that purpose, recognizing, of course, that the invention may be embodied in various combinations as disclosed as well as other forms radically different from the illustrative embodiments. However, the specific structural and functional details disclosed herein are representative and provide the basis for the claims herein which define the scope of the invention.

Figure 1:
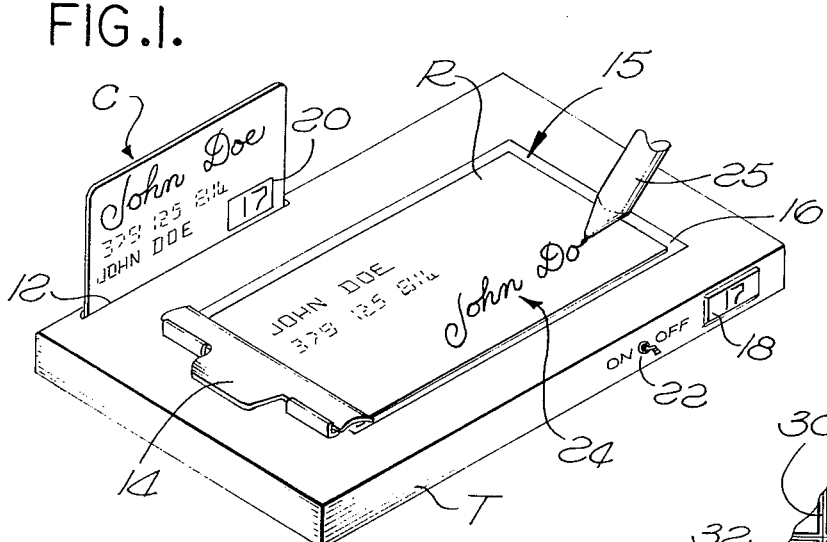
FIG. 1 is a perspective view of a simple embodiment of the present invention.

Referring initially to FIG. 1, a tablet T is illustrated supporting a credit card C and a sales record R. Of course, although the credit card C and the sales record R are disclosed to exemplify embodiments of the system as disclosed herein, and the use thereof, it is to be understood in accordance with the art that such devices suggest a broad range of equivalents and alternatives which may be used with embodiments of the present invention.

As illustrated, the tablet T incorporates a slot 12 for supporting the credit card C and a clamp 14 for holding the record R over an area 15 incorporating a signature plate 16. Additionally, the tablet T incorporates a window 18 in which a numerical display is presented in the form of an authenticity characteristic for an executed signature.

Considering an exemplary use of the tablet T, it is to be understood that a subject or the bearer of the card C has performed his signature under observation to establish a representative standard identification or characteristic, i.e. number 17 as disclosed below. That characteristic generally is related to the velocity or speed with which the subject's signature is executed.

As indicated, the characteristic number is displayed on the card C in a box 20. Of course, a wide variety of other techniques for providing the reference or standard characteristic may be employed, however, the technique and embodiment of FIG. 1 is deemed to be effective for accomplishing an understanding of certain features of the present invention.

Considering the use of the embodiment of FIG. 1, it is further to be assumed that the holder of the card C is in the process of consummating a transaction, as with a merchant, which transaction involves the conveyance of a value, e.g. goods or services to the card holder on a credit basis. In the formalization of the transaction, the relevant data (not illustrated) is recorded on the record R after which the card holder executes the record with his signature. However, prior to placing the tablet T in a position for signature by the card holder, the merchant's representative actuates a toggle switch 22 to the "on" position to energize an electrical system within the tablet T. Thereafter, as the card holder executes the record R with his signature 24 (as indicated) the electrical system within the tablet T develops an observed characteristic in the form of a numeral which is displayed in the window 18. In the event of a coincidence between the "reference" and "observed" characteristics, the identity of the card holder is confirmed. However, divergence between the "reference" characteristic (appearing in the box 20) and the test or "observed characteristic" (appearing in the window 18) is strongly suggestive that the signature 24 was not executed by the assigned holder of the card C.

As indicated above, the authenticity characteristic, e.g. the numeral 17, is developed for a signature in accordance herewith, based upon the velocity of a tip 25 of a pen (or other writing instrument) as the signature is executed. Generally, a person will execute his own signature much faster than a forger. Of course, the forger is normally concerned with a deliberate rendition of the signature which usually necessitates relatively slow motion. As a consequence, a signature which bears any reasonable similarlity to the original, and which is executed in a proper time interval, is very likely genuine.

In relation to the time-of-execution criterion, for example, the numeral 17 may indicate generally the speed of the pen point sensed during a predetermined portion of the time when the signature is performed. That is, as an indication of velocity or speed, the signature characteristic is somewhat related to the distance traveled by the pen point during a predetermined interval of observation. Alternatively, as another indication related to speed, the characteristic may indicate a time interval required for the pen point to travel approximately a predetermined distance. As still other alternatives, indications related to the speed or velocity of the pen point may be variously analyzed, characterized or coded to provide a signature characteristic.

Several considerations pertinent to the present invention can now be appreciated. First, recognizing that with relatively little practice many people can forge a passable imitation of most signatures, very few people can forge a signature at a speed which approaches that of the true signer. Consequently, developing a coincident speed-related characteristic in executing a forgery presents a substantial problem. Also, compound speed-related information characterizing a signature may involve different intervals of observation further increasing the difficulty of rendering an acceptable forgery. In that regard, although not apparent from a signature, some signers progressively accelerate the signature. Of course, depending upon the nature of the signature, speed changes may vary; and, accordingly, the present invention accommodates the further characterization of a signature in which the names are executed in an unnatural order. For example, a person may have his signature characterized on the basis of a speed pattern which results from executing his last name prior to the execution of his first name or initials. Such a pattern would further increase the difficulty of performing a reasonable forgery while concurrently generating a similar characteristic.

Figure 2:
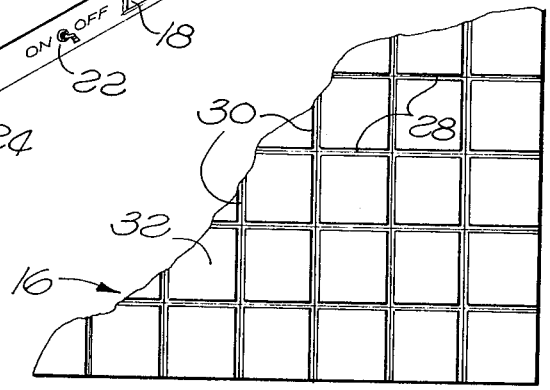
FIG. 2 is an enlarged fragmentary plan view of a portion of the tablet incorporated in the embodiment of FIG. 1.

Turning now to structural aspects of the embodiments of the present invention, in accordance herewith, an effective and inexpensive speed-sensing device is employed. Specifically, the plate 16 is orthogonally scored to provide a surface that will form impulses when traversed by the forcefully applied tip of a writing instrument. Referring to FIG. 2, an enlarged fragment of the plate 16 illustrates horizontal scores 28 and vertical scores 30. It is recognized that while the illustrative form does not provide a precise measure of distance, depending upon the angle of motion; present indications indicate satisfactory accuracy.

Figure 3:
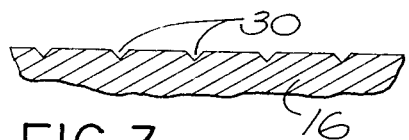
FIG. 3 is a fragmentary sectional view taken through the component of FIG. 2.

Recognizing that the plate 16 may take a variety of different forms, one effective form comprises a sheet metal plate with the scores 28 and 30 substantially at right angles and spaced apart by 1/20 of an inch. As indicated in FIGS. 1 and 3, the plate 16 is approximately ¾ inch by 3 and ½ inches and the scores take the form of V-grooves. Thus, as the pen tip 25 traverses the surface 32 with a relative force therebetween, a series of impulses are developed which may be readily converted to a representative electrical signal. For example, various forms of microphones 34 (FIG. 4) may be placed contiguous to the plate 16 to provide an electrical signal that is representative of the pen tip 25 moving across the scores 28 and 30. It is to be noted that such a representative signal is not position-critical and, additionally, faithful reproduction has been accomplished with a variety of pens and other writing implements, spaced apart from the surface 32 by various multiple-tissue records.

It should be noted that although the tablet disclosed herein has been determined to be economical and effective incorporating the plate 16, other aspects of the system may be implemented utilizing other physical signal generators. Specifically, for example, the tablet-related concepts and structure set forth in U.S. Pat. No. 3,732,557, granted May 8, 1973, to Evans and Sutherland may be utilized.

The impulses developed from the motion (in forceful engagement) of the pen tip 25 on the plate 16 (FIG. 4) are converted to an electrical form by the microphone 34 for application to a signal processing circuit 36. Essentially, the signal from the microphone 34 incorporates a series of spikes (representing the individual developed impulses) along with substantial low level noise. The spurious noise content of the signal is eliminated by the signal processing circuit 36 which also functions to form the spikes into similarly shaped pulses. Various forms of processing circuits to accomplish such functions are well known in the prior art, for example, certain threshold-trigger circuits may be effectively employed.

The output velocity signal from the processing circuit 36, in the form of irregularly spaced pulses (representative of the generated impulses) is applied to a capacitively-coupled "and" gate 38 as well as a capacitor 40. The pulses incrementally charge the capacitor 40 to a threshold level at which a monostable multivibrator 42 is actuated to provide a timing pulse through a conductor 44 to the "and" gate 38. Essentially, the capacitor 40 functions to acquire a charge from several pulses of the processing circuit 36 prior to actuating the multivibrator 42 which qualifies the gate 38 for a predetermined timing interval. Thus, the system does not begin operation until some substantial writing occurs.

During the test interval when the gate 38 is qualified, pulses from the circuit 36 pass through a scale-of-ten counter 46 to a digital counter 48. Thus, one of every 10 pulses from the "and" gate 38 is tallied in the digital counter 48 which incorporates a visual display 48a as appears in the window 18 (FIG. 1).

Figure 4:
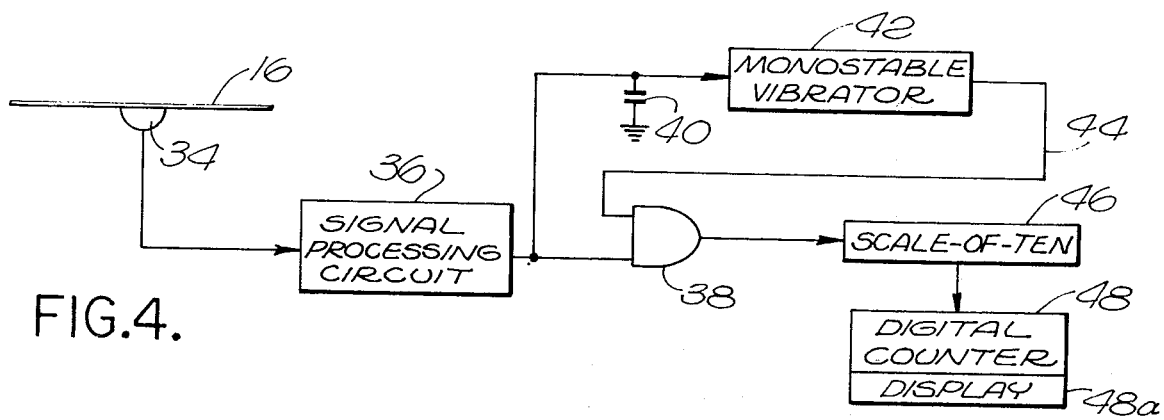
FIG. 4 is a block and logic diagram of the system in the embodiment of FIG. 1.

Relating the structure of FIG. 4 to the unit of FIG. 1, the operational sequence will now be described in the course of a conventional use of the unit. Preliminarily, the operator or merchant's representative will prepare the record R indicating the significant aspects of the transaction. Of course, a wide variety of procedures and techniques exist in that regard. Thereafter, the operator notes the numeral displayed in the box 20, moves the switch 22 to the "on" position, and places the tablet T before the card bearer for his signature.

Preliminarily, the card bearer might verify the information on the record R and in that regard may use a pen to variously touch the record R which could result in impulses of the type under observation. Such impulses are detected by the microphone 34 (FIG. 4) and may be processed by the circuit 36 to provide pulses which accumulate charge on the capacitor 40. However, the leakage characteristics of the capacitor 40 are related to such "noise" impulses with the consequence that the capacitor 40 does not attain a sufficient level of charge to trigger the multivibrator 42.

Normally, after checking the content of the record R, the card holder will begin the execution of the signature 24. At that stage, impulses are developed in a continuing repetitive pattern with the result that pulses from the circuit 36 (FIG. 4) soon charge the capacitor 40 to a threshold and trigger the multivibrator 42 to initiate an observation interval. During the interval of observation, the multivibrator 42 qualifies the "and" gate 38 to pass pulses from the circuit 36 through the scale-of-ten counter 46 to the digital counter 48. For example, the interval of observation may be initiated near the completion of the first letter of a signature. Thereafter, pulses are tallied toward a number which is manifest as the authenticity characteristic.

Of course, various techniques may be employed; however, by scaling the pulse tally by a division of ten, round off is accomplished which may be employed to minimize the requirement for judgement by the operator. For example, in executing the signature 24 (FIG. 1) the card bearer might generate 175 impulses during the observation interval which upon application of the scale-of-ten counter 46 (FIG. 4) would result in a tally of seventeen by the digital counter 48. Consequently, the numeral seventeen would be displayed in the window 18 (FIG. 1). Assuming that the bearer's standard characteristic was based upon signatures which generated a tally between 170 and 179 pulses, the standard characteristic would be seventeen. Consequently, the operator involved in the transaction under consideration, upon observing a reasonable similarity of signation and an identity of authenticity characteristic numerals, would be informed that the signature is very likely genuine and acceptable.

To complete the explanation of an operating sequence for the system, after the interval of observation, the monostable multivibrator 42 resets and in that regard is inhibited from again being set until the passage of a clearing interval. When the multivibrator 42 is reset, the gate 38 is inhibited with the result that no further pulses are tallied. Accordingly, the interval of observation might be concluded when the card bearer has completed some significant portion of his signature. For example, the interval might involve some four or five letters, said letters not appearing as a discrete group to a person visually examining the completed signature.

The possiblity for some variation in the authenticity characterstic numeral stems from structural tolerances as well as varying personal performances. In that regard, a considerable analysis has resulted in the conclusion that most persons who are the assigned bearers of credit cards execute their signature so frequently that the pattern is quite consistent. However, it is to be appreciated that although the plate 16, as incorporated in various units, may well be manufactured to a high standard, some deviation can be anticipated. Also, the timing interval of the multibrator 42 (FIG. 4) may also be subject to some variation. To avoid the need for a time interval, in some instances it may be preferable to employ a system which still employs the criterion of velocity or speed, however, which is not related to a predetermined time interval. In some instances it may be preferable to relate the characteristic numeral as: the time interval required for a person to generate a predetermined number of impulses during the course of executing his signature. Such a system is illustrated. in FIG. 5 and will now be considered in detail.

A plate 50 (similar to the plate 16) is sensed by a microphone 52 (similar to the microphone 34) for developing electrical signals representative of generated impulses. The electrical signal from the microphone 52 is applied through a signal processing circuit 54 (similar to the circuit 36) to a junction point 56.

In a mode of operation that is somewhat similar to that of the capacitor 40 (FIG. 4) a capacitor 58 (FIG. 5) is connected to the junction point 56 to be charged by pulses from the circuit 54. Upon attaining a threshold level of charge, the capacitor 58 triggers a threshold circuit 60 to qualify an "and" gate 62. The threshold circuit 60, various forms of which are well known in the art, simply provides the high level of a binary output signal to the gate 62 during the time when the capacitor 58 is maintained above a threshold level of charge.

Upon shifting to the higher signal level, the output from the threshold circuit 60 also initiates the operation of a timing device 64 which provides a numerical output (display 64A) indicative of short intervals of time, e.g. tenths of seconds. That is, the timing device 64 provides a digital readout indicative of the time or interval between receipt of "start" and "stop" signals as indicated. The timing device is cleared or reset concurrently with the starting operation.

As indicated above, the output signal from the threshold circuit 60 is also applied to qualify the "and"

gate 62. Accordingly, during the interval when the timing device is running, i.e. generating the variable time interval, pulses from the signal processing circuit 54 are capacitively coupled through the "and" gate 62 to a counter 66, for individual tallying. The counter may comprise a multiplestage binary structure as well known in the prior art which provides an output to a conductor 68 upon the accumulation of a predetermined count. For example, the counter 66 may provide an output at a regular binary value, e.g. 512.

Upon the occurrence of an output from the counter 66 to the line 68, the timing device 64 is stopped to visually indicate a numerical authenticity characteristic. Essentially, the indication is representative of the time that a person executing his signature requires to move the pen through a predetermined distance. That is, as the impulses generated are somewhat related to distance, the time required for the pen motion to develop a predetermined number of such impulses relates to the distance traveled in such a period and is, accordingly, an indication of speed or velocity in accordance herewith.

Figure 5:
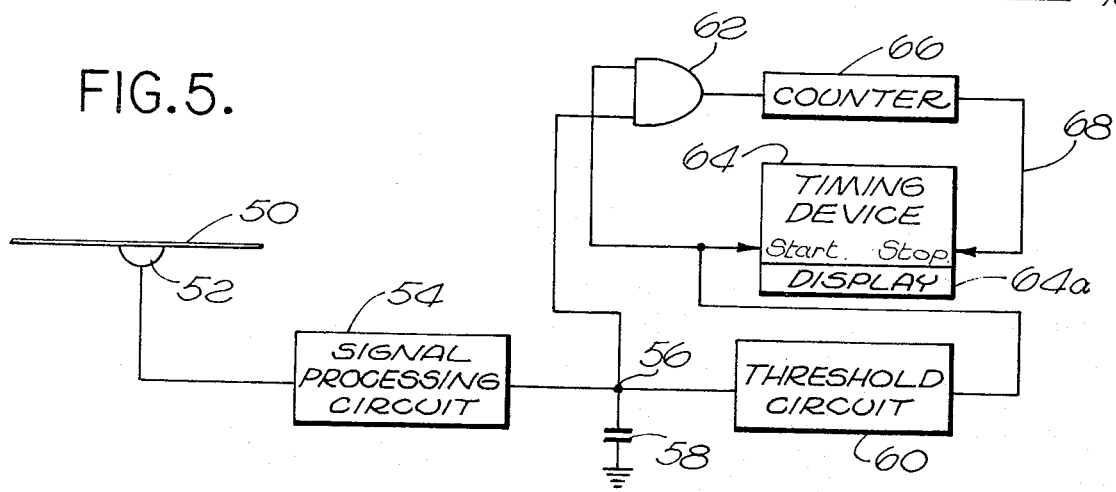
FIG. 5 is a block and logic diagram of one alternative embodiment of the present invention.

The use of the embodiment of FIG. 5 is identical with that described above with reference to FIGS. 1 and 4. Essentially, the authorized card holder performs his signature several times to establish an average numerical characteristic, i.e. an indication of the time required for him to move a pen so as to generate a predetermined number of impulses. Such a characteristic is then employed as a standard to be tested against the characteristic resulting from the execution of his signature to confirm his identification.

It is emphasized that the present invention may be embodied in many different forms and in that regard, the embodiments described above are relatively simple and inexpensive. In relation to these embodiments, various prior-art techniques may be employed with the objective of improving the statistics of a verification. For example, it might be desirable for the authorized card holder to have committed his authenticity characteristic number to memory which he would provide to the merchant's representative prior to the test. Of course, coding techniques might also be employed to inform the merchant's representative of the authenticity characteristic numeral without rendering that information available to anyone in possession of the credit card. Of course, these considerations are merely representative and are not to be inferred as comprehensive of various procedures that might be implemented attendant the use of systems of the present invention.

Figure 6:
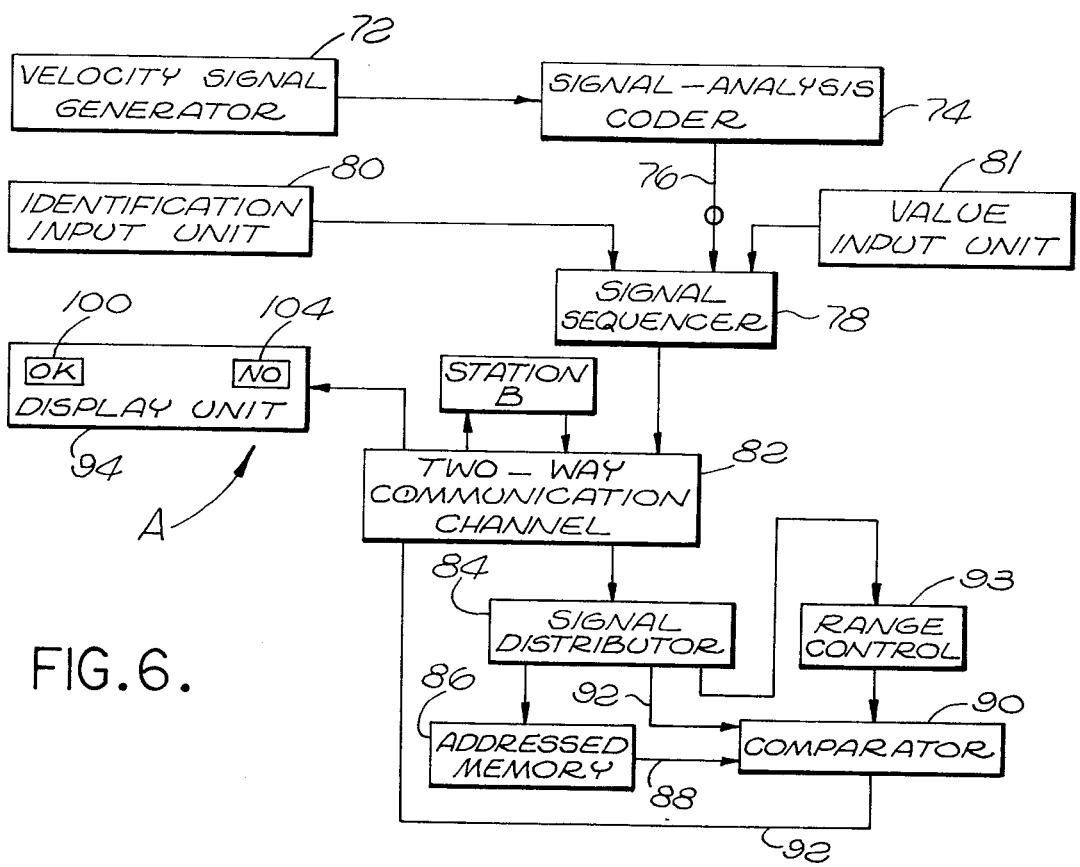
FIG. 6 is a block and logic diagram of another alternative embodiment of the present invention.

In other embodiments, the system may function more comprehensively as to perform comparisons (locally or remotely). Also, signature characteristics may be developed as by waveform analysis, e.g. frequency discrimination. Such an embodiment is illustrated in FIG. 6 and will not be considered in detail. The structure for developing the velocity signal (as appears at junction 56, FIG. 5) is represented by a block designated velocity signal generator 72. As indicated above, although an effective form for the generator 72 is disclosed herein, it is to be recognized that other structures may be utilized within the purview of the present invention to provide a velocity-related signal.

The output from the generator 72 (in the form of a sequence of pulses which may be clocked) is applied to a signal analysis coder 74. Recapitulating to some extent, the velocity signal received by the coder 74 defines pulses, the spacing of which is related to the speed or velocity of the tip of a writing instrument. From such a velocity signal, the coder 74 develops a signal format representing a characteristic for the executed signature. Such characteristic signals may simply take the form of a multiple-bit binary word which is supplied through a line 76 to a signal sequencer 78 which also receives a signal from an identification input unit 80 and a value input unit 81.

The sequencer 78 compiles a single signal sequence, e.g. composite binary code word, which contains information (1) identifying a subject; (2) manifesting his signature characteristics; and (3) the value of the transaction. In that regard, the identification input unit 80 and the value input unit 81 may comprise any of a variety of devices for coding an identification of the subject and the transaction value. For example, the units 80 and 81 may sense data or may comprise a keyboard for manually encoding the information.

The data compiled is used to confirm the identity of the subject with an accuracy related to the value involved. The machine functions to compare the signature characteristic alleged for a specific subject with the characteristic on file (locally or remotely) for such subject demanding an accuracy commensurate with the value of the particular transaction.

In the embodiment of FIG. 6, the signal sequencer 78 receives three sets of binary signals which are combined into a single code word. In that regard, various forms of sequencers are well known in the prior art which may be employed as the sequencer 78. The composite binary code word from the sequencer 78 is passed through a communication channel 82 to a signal distributor 84. The channel 82 might comprise a great variety of well known structures, e.g. a telephone system, special-purpose wiring, and so on, and may also incorporate structure for multiplexing to accommodate a plurality of inquiry stations described above, as station A and duplicated as in a station B.

Data from the communication channel 82, which is supplied to the signal distributor 84, is divided into code words that again are representative of the subject's identification, his signature, and the transaction value. The signals representative of identification are applied to a memory 86 which is addressed by such signals. That is, the memory 86 is addressed by the identification signals to designate a location containing the standard signature characteristic for the identified subject.

The signals representative of the standard characteristic are supplied through a conductor 88 to a comparator 90. Another input to the comparator 90 is from the signal distributor 84 through the line 92 and comprises the "test" signature characteristic. Thus, the comparator 90 receives the "standard" characteristic recorded for a subject and the "test" characteristic dynamically generated by the subject. Additionally, the comparator 90 receives an indication of the "value" signals through a range control unit 93.

The comparator 90 may comprise any of a variety of well known binary comparators to provide the result of a comparison as a binary output. The operation of the comparator 90 is variable in that the range control 93 establishes the permissible difference between the "test" signature characteristic and the "reference" signature characteristic which will be approved. Structurally, the control 93 quantizes values to various levels to accordingly provide controls for the comparator 90. For example, a high value will establish the operation of the comparator 90 such that only slight differences in the compared signals will be permitted to produce an indicataion of similarity.

Should the comparison by the comparator 90 meet the standard, a binary signal is applied to the line 92 indicative of approval. Such a signal passes through the communication channel 82 (in the opposed direction to that indicated above) and actuates a display unit 94 to manifest an "approval" at window 100.

Should the comparison performed by the comparator 90 indicate an excessive deviation, the signal provided by the comparator 90 through the line 92 and the channel 82 is sensed by the display unit 94 to actuate an authenticity characteristic display in window 104 rejecting the identification. Of course, as in each case, management policies and procedures will be implemented in accordance with standards and objectives.

Considering the operation of the system of FIG. 6 in somewhat greater detail, prior to an actual use of the system, as with the systems described above, subjects execute their signature several times pursuant to the development of a standard characteristic. Such characteristics, represented as by binary signals, are then loaded into the memory 86, in cells which are addressed by the identification assigned to each subject.

Embodiments of the system of FIG. 6 will normally be at separated locations divided by the communication channel 82. As indicated above, several inquiry stations (illustrated above the channel 82) may be operated with one central station (below).

The system may vary with regard to the subject's identification depending upon design considerations. For example, the identification data might be sensed from a credit card, provided by the subject as a memorized personal identification number, or otherwise variously provided to the unit 80 for generating representative digital signals. In any event, upon the occurrence of an actual verification operation, the units 80 and 81 are actuated to provide identification and value signals, respectively. Also, the velocity signal generator 72 develops signature characteristic signals.

The identification signals, value signals, and signature characteristic signals are supplied in sequence as a binary word by the sequencer 78 for transmission through the channel 82 and the signal distributor 84, respectively, to the memory 86, the range control 93 and directly to the comparator 90. The operation actuates the memory 86 to provide the "standard" signature characteristic through the line 88 for comparison with the "test" signature characteristic. The result of that comparison, under standards established by the value-representing signals, is indicated by signals returned through the channel 82 to actuate the display unit 94. This guidance is given the person in control of a transaction.

Figure 7:
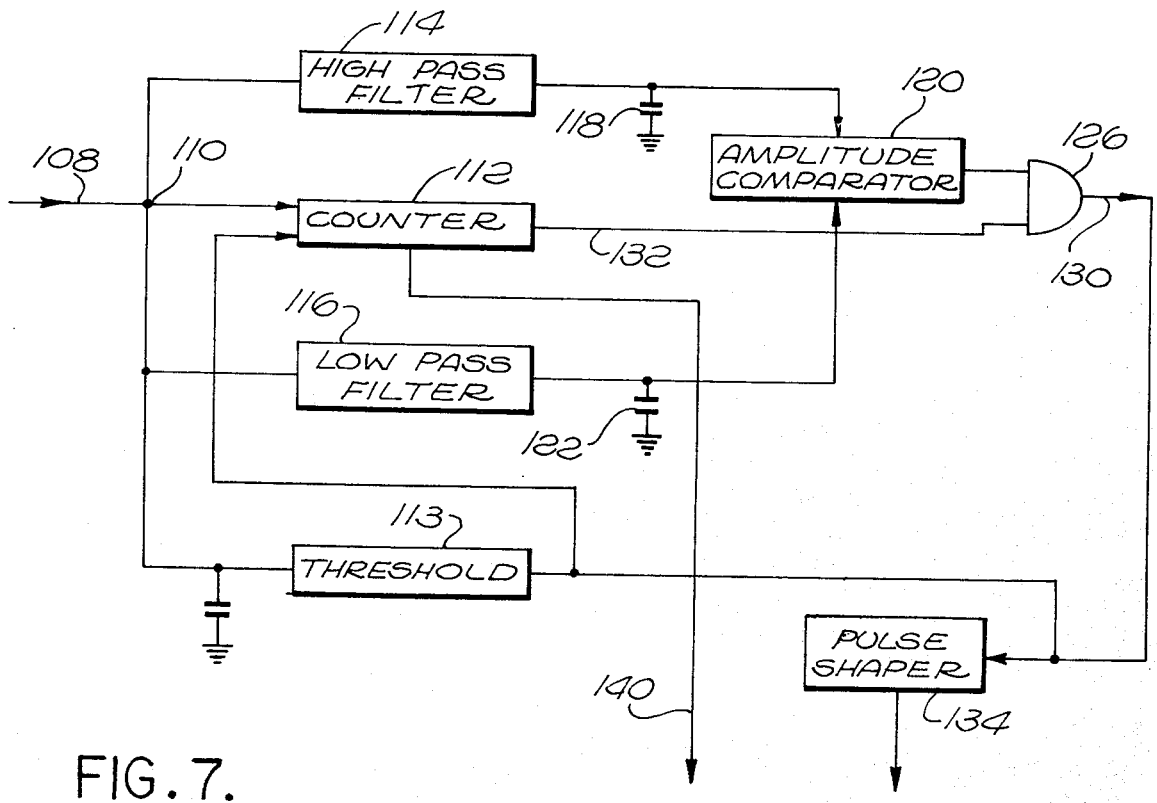
FIG. 7 is a block and logic diagram of one form of signal analysis component employed in the system of FIG. 6.

In addition to providing signature characteristics primarily on the basis of speed or velocity, various waveform analytical techniques may be implemented in accordance herewith. For example, the coder 74 may develop a binary-signal signature characteristic on the basis of different intervals of observation. One form of such a coder involves a philosophy of operation based upon a person executing different portions of his signature at different speeds. Generally, people tend to write at several different speeds during the execution of their signature. This consideration appears to be particularly true with regard to people who frequently perform their signature. The coder as illustrated in FIG. 7 functions to provide a characteristic which is based upon speed observations during different portions of the signature.

The output from the velocity signal generator 72 (FIG. 6) is applied to a line 108 (FIG. 7) which is in turn connected to a junction point 110. A counter 112 is connected to the junction point 110 and functions to tally or accumulate individual pulses of the velocity signal. The counter 112 may incorporate an automatic reset, which is operative upon the passage of a short interval during which no pulses are received.

The junction point 110 is also connected to a high pass filter 114 and a low pass filter 116. These filters are generally of broad range in relation to the velocity signal, however, have a frequency cross-over substantially at the midpoint for a wide range of velocity signals.

The output from the high pass filter 114 is applied to a capacitor 118, the charge of which is applied to an amplitude comparator 120. Somewhat similarly, the output from the low pass filter 116 is applied to a capacitor 122, the charge of which is also applied to the amplitude comparator 120. The amplitude comparator 120 has a bi-level output. Specifically, during intervals when the charge on the capacitor 118 exceeds the charge on the capacitor 122, the output from the amplitude comparator 120 is at a high level. Conversely, when the charge on the capacitor 122 exceeds that on the capacitor 118, the output from the comparator 120 is at a low level.

The output from the amplitude comparator 120 is applied to an "and" gate 126 along with an output from the counter 112. Accordingly, during predetermined count ranges of the counter 112, the "and" gate 126 is qualified to provide a binary signal from the comparator 120 to an output line 130.

Considering the operation of the system of FIG. 7 in somewhat greater detail, assume for example that the counter 112 is connected to provide a qualifying signal to a conductor 132 at three distinct predetermined counts or tallies of the velocity signal. Assuming a construction for the velocity signal generator in which even a short signature will develop several hundred pulses, the counter 112 may be connected to provide output pulses at the instance when the count has attained values of 64, 128, and 192 Accordingly, the comparative charges of the capacitors 118 and 122 are observed at the stages of the signature coinciding to these counts to provide a binary-signal signature characteristic clocked by signals in the line 140.

Considering the example more specifically, assume that a subject performs the initial part of his signature very rapidly resulting in a relatively high-frequency velocity signal. Further assume that after an initial burst of speed the subject slows the pen movement for an interval after which the next interval involves a relatively high speed. The development of a characteristic for such a subject would occur as follows. First, during the relatively high speed interval, the high past filter 114 would pass considerably more current than the low pass filter 116. As a consequence, the accumulated charge on the capacitor 118 would exceed that on the capacitor 122. During such a time, as the counter 112 would attain the count of 64 and, accordingly, would provide a pulse through the conductor 132 to qualify the gate 126. Thereupon, the gate would pass the high binary output from the amplitude comparator 120 to a pulse shaper 134. Consequently, the initial binary digit position of the authenticity characteristic would be a pulse or high level signal.

As the execution of the signature continued, as assumed, a low speed period would exist during which the low pass filter 116 would pass a greater current than the high pass filter 114 with the result that the charge on the capacitors 118 and 122 would reverse. That is, the charge on the capacitor 118 would tend to leak off while the charge on the capacitor 122 would build up. Assuming such a state at a count of 128 in the counter 112, the amplitude comparator 120 would provide a low level signal with the result that the qualification of the "and" gate 126 would result in a low output and the formation of no pulse at the second pulse position.

During the following interval, when the writing velocity increases, the charge on the capacitors 118 and 122 again reverse with the result that when the counter 112 attained a count of 192, a pulse would be provided from the "and" gate 126 to result in a pulse from the pulse shaper 134. Thus, it may be seen that the output from the pulse shaper 134 is a 3-bit binary word. Should the signature be executed slowly in its entirety, the authenticity characteristic would simply consist of no pulses, e.g. 000. In the situation as assumed (fast-slow-fast) the characteristic would be 101. Thus, the possibilities define essentially eight characteristics. Of course, the illustrative teaching system could be expanded to attain various numbers of bits in accordance with design considerations.

From the above, it may be seen that the present system may be variously implemented to display authenticity characteristics, numerals, or approvals which are derived from the velocity with which a signature is executed. Recognizing the numerous possible variations in structures for utilizing that criterion, the scope hereof shall be deemed to be determined by the claims as set forth below.

What is claimed is:

1. A system for authenticating a signature upon execution as with a writing instrument having a writing tip, comprising:
    a tablet means defining a surface for supporting a signature during execution, said tablet surface including discontinuities to form impulses when traversed by the forcefully applied tip of said writing instrument;
    electrical means for sensing said impulses to provide an electrical signature signal that is frequency related to the velocity of motion in the execution of said signature;
    signal-processing means for receiving said frequency related signature signal to provide a characteristic data signal for characterizing said signature; and
    means connected to receive said characteristic data signal to manifest an authenticity characteristic indicative of the authenticity of said signature.

2. A system according to claim 1 wherein said tablet means includes a plate defining an irregular surface scored by discontinuities in a regular pattern for developing impulses with the forceful execution of said signature thereon.

3. A system according to claim 1 wherein said signal-processing means comprises means for providing said characteristic data signal as a time-distance numerical representation for at least a fragment of the execution of said signature.

4. A system according to claim 3 wherein said signal-processing means comprises means for providing said characteristic data signal as a numerical value representative of distance in relation to time.

5. A system according to claim 3 wherein said signal-processing means comprises means for providing said characteristic data signal as a numerical value representative of time in relation to distance.

6. A system according to claim 1 wherein said signal-processing means provides said characteristic data signal as a numerical value indicative of different relative velocities of said writing instrument to said tablet surface in the execution of said signature.

7. A system according to claim 1 further including memory means to record a standard characteristic data signal for a signature; and said means connected to receive said characteristic data signal includes means for comparing data represented by said characteristic data signal with said standard characteristic data signal to provide an authenticity characteristic.

8. A system according to claim 7 further including means to control said means for comparing to vary the range of coincidence in accordance with the significance of the authentication.

9. A composite system including a plurality of systems in accordance with claim 1 wherein said means connected to receive said characteristic data signal includes communication means, said composite system further including central means for receiving characteristic data signals from said plurality of systems to provide signals representative of authenticity characteristics for manifestation by said systems.

10. A system according to claim 9 wherein said central means includes memory means and comparison means for comparing said characteristic data signal with standard data to provide an authenticity characteristic signal.

* * * * *